US012116145B2

(12) United States Patent
Meisner et al.

(10) Patent No.: US 12,116,145 B2
(45) Date of Patent: Oct. 15, 2024

(54) DEVICE FOR CREATING A STIFFENED REGION ON AN OUTER STRUCTURE OF AN AIRCRAFT FOR SUBSEQUENTLY PROVIDING A SERVICE ACCESS IF REQUIRED, AND METHOD FOR PRODUCING AND USING SUCH A SERVICE ACCESS

(71) Applicant: Airbus Defence and Space GmbH, Taufkirchen (DE)

(72) Inventors: Christoph Meisner, Taufkirchen (DE); Kay Dittrich, Taufkirchen (DE); Mircea Calomfirescu, Taufkirchen (DE); Sven Brinkmann, Taufkirchen (DE)

(73) Assignee: AIRBUS DEFENCE AND SPACE GmbH, Taufkirchen (DE)

( * ) Notice: Subject to any disclaimer, the term of this patent is extended or adjusted under 35 U.S.C. 154(b) by 0 days.

(21) Appl. No.: 18/477,264

(22) Filed: Sep. 28, 2023

(65) Prior Publication Data
US 2024/0140616 A1  May 2, 2024

(30) Foreign Application Priority Data
Oct. 27, 2022 (DE) .......................... 102022211424.8

(51) Int. Cl.
*B64F 5/10* (2017.01)
*B64C 1/14* (2006.01)

(52) U.S. Cl.
CPC . *B64F 5/10* (2017.01); *B64C 1/14* (2013.01)

(58) Field of Classification Search
CPC ...... B64F 5/10; B64F 5/40; B64F 5/60; B64C 1/14; B64C 1/1446
See application file for complete search history.

(56) References Cited

U.S. PATENT DOCUMENTS

| 2,576,734 A | 11/1951 | Voelker |
| 8,141,820 B2 | 3/2012 | Zuniga |

(Continued)

FOREIGN PATENT DOCUMENTS

| DE | 102004032554 A1 | 1/2006 | |
| EP | 1614942 A1 * | 1/2006 | ............. B65D 90/10 |

(Continued)

OTHER PUBLICATIONS

Search Report for DE Application No. 10 2022 211 424.8 dated Jun. 5, 2023, 10 pages.

(Continued)

*Primary Examiner* — Bayan Salone
(74) *Attorney, Agent, or Firm* — Nixon & Vanderhye P.C.

(57) ABSTRACT

A device for creating a stiffened region on an outer structure of an aircraft for subsequently providing a service access if required is disclosed having an outer structure, a reinforcing plate which is mounted in a predetermined installation region on an inner side of the outer structure and forms a contact surface between the reinforcing plate and the outer structure. The reinforcing plate has a through-opening along the surface normal of the contact surface, and a connecting material which connects the reinforcing plate to the outer structure in an edge region of the contact surface by substance-to-substance bonding and/or by interlocking engagement.

14 Claims, 2 Drawing Sheets

(56) References Cited

U.S. PATENT DOCUMENTS

| | | |
|---|---|---|
| 8,986,491 B2 | 3/2015 | Schumacher, Jr. et al. |
| 2006/0186606 A1 | 8/2006 | Schulz |
| 2009/0166473 A1* | 7/2009 | Zuniga Sagredo ... B64C 1/1446 244/129.4 |
| 2012/0187247 A1* | 7/2012 | Delgado ............... B64C 1/1446 244/129.5 |
| 2014/0191085 A1 | 7/2014 | Alazraki |

FOREIGN PATENT DOCUMENTS

| | | | | |
|---|---|---|---|---|
| EP | 2902313 A1 * | 8/2015 | ........... | B64C 1/1446 |
| WO | WO-2009083575 A2 * | 7/2009 | ........... | B64C 1/1446 |

OTHER PUBLICATIONS

EP Search Report for application No. EP 23192314.5, seven pages, dated Feb. 6, 2024.

* cited by examiner

DEVICE FOR CREATING A STIFFENED REGION ON AN OUTER STRUCTURE OF AN AIRCRAFT FOR SUBSEQUENTLY PROVIDING A SERVICE ACCESS IF REQUIRED, AND METHOD FOR PRODUCING AND USING SUCH A SERVICE ACCESS

CROSS RELATED APPLICATION

This application claims priority to German Patent Application DE 102022211424.8, filed Oct. 27, 2022, the entire contents of which is hereby incorporated by reference.

FIELD OF THE INVENTION

The present invention relates to a device for creating a stiffened region on an outer structure of an aircraft for subsequently providing a service access if required, to an aircraft having such a device, and to a method for producing and using a service access for an outer structure of an aircraft.

BACKGROUND

Current access panels are installed at locations at which systems inter alia beneath the aircraft skin require maintenance and repair access during the service life of the aircraft. Access panels are usually provided with a door provided especially therefor and with a special landing zone on the structure to which the door is fastened, with associated high tolerance requirements and further materials for ensuring the specific requirements, such as, for example, the aerodynamic surface quality of the component in question. These measures are necessary because the gap around the access door and the resulting edges would limit the performance of the aircraft, for example as regards aerodynamics. The measures for producing the current access panels increase the production, maintenance and repair costs for the product as a whole and at the same time increase the total weight of the aircraft structure.

SUMMARY

The present invention encompasses providing a less expensive and simpler service access for maintenance work on an aircraft.

In accordance with an exemplary embodiment, this is achieved by the subject matter of each of the independent claims.

In accordance with an exemplary embodiment, a device for creating a stiffened region on an outer structure of an aircraft for subsequently providing a service access if required is provided. The device comprises an outer structure and a reinforcing plate which is mounted in a predetermined installation region on an inner side of the outer structure and forms a contact surface between the reinforcing plate and the outer structure. The reinforcing plate has a through-opening along the surface normal of the contact surface. The device further comprises a connecting material which connects the reinforcing plate to the outer structure in an edge region of the contact surface by substance-to-substance bonding or by interlocking engagement.

In accordance with an exemplary embodiment, there is provided an aircraft having a device according to the invention.

In accordance with an exemplary embodiment, there is provided a method for producing and using a service access for an outer structure of an aircraft. The method comprises the step of providing a device according to the invention and the step of removing a section of the outer structure along at least part of the contact surface in order to provide the closable service access, wherein the section has a smaller areal extent than the reinforcing plate.

An idea underlying the present invention consists in treating the outer structure of the aircraft in such a manner that an additional belt, or a reinforcing plate, is added from the inner side of the outer structure. This additional belt provides a stiffened region for a new access panel, if required. These predetermined installation regions for the access panel are taken into consideration at the construction stage. If required, the access panel is opened during later operation.

Many pieces of equipment or replaceable parts (line replaceable items; LRI) are designed to be maintenance-free and need to be accessible only in the event of a failure. In many aircraft, access to these pieces of equipment is therefore not necessary. Consequently, an access panel is not normally required either. In the event of a fault, however, the devices, lines, etc. must be repaired or replaced. In this case, the access panel can be prepared for access.

In accordance with an exemplary embodiment, the costs and the complexity of access panels can be reduced. Furthermore, the present invention can ensure that the overall requirements that are made of the surface quality are met. In addition, the present invention improves the problem of the subsequent use of inspection panels in regions which were defined as "maintenance-free" on construction but which, on the basis of operational experience, require unplanned regular maintenance measures.

Furthermore, the total number of access panels can be reduced. As a result of the reinforcing plate that is already implemented, perfect accuracy of fit of the newly created access panel can further be ensured.

In accordance with an exemplary embodiment, the outer structure has a removable section which has a smaller areal extent than the reinforcing plate, wherein the through-opening has a smaller areal extent than the removable section, so that a first contact region of the contact surface between the reinforcing plate and an edge region of the removable section and a second contact region of the contact surface between the reinforcing plate and a region of the structure that is adjacent to the edge region of the removable section is formed. In this way, the removable section can be mounted on its inner side on the reinforcing plate on re-installation. It is thus possible to reduce complex positioning measures for adapting the section as evenly as possible to the outer structure so that the transitions between the section and the outer structure are substantially planar. The edge region of the removable section can further be suitably supported by the reinforcing plate.

In accordance with an exemplary embodiment, the device further has a separating means for detaching a removable section of the outer structure from the reinforcing plate without leaving any residue, which separating means is provided at least in some portions in the first contact region of the contact surface. Adhesive bonding of the outer structure to the reinforcing plate can thus be avoided in the region where the separating means is provided, so that the removable section can be extracted more easily as soon as the section has been separated from the outer structure.

In accordance with an exemplary embodiment, the separating means is in the form of a separating film, a peel ply or a separating agent. The separating film may be produced from fluoropolymer. The separating agent can in particular be in the form of a separating liquid. The separating means thus has sufficient adhesive properties to various materials, in particular to fibre composites. The separating film or the peel ply can further be detached in a simple manner by hand.

According to a development of the device, the separating means is formed along the entire edge region of the removable section.

According to a development of the device, the first contact region is in the form of a support frame for supporting the edge region of the removable section. In this way, the removable section is also larger than the through-opening and therefore cannot fall through the outer structure into the interior of the aircraft.

In accordance with an exemplary embodiment, the reinforcing plate has at least one of the following materials: a metallic material, in particular aluminium, a ceramics material, a polymer material and a fibre-reinforced composite material, in particular a carbon fibre composite material or a glass fibre composite material. The reinforcing plate can thus have a low weight. Moreover, these materials have been comprehensively tested and proven in aircraft construction, so that they can be qualified comparatively quickly for use in aviation.

In accordance with an exemplary embodiment, the reinforcing plate is produced from the same material as the outer structure. The reinforcing plate thus has the same properties as the outer structure. In particular, this can have an advantageous impact on thermal expansion and electrical and/or thermal conductivity, since aircraft can be exposed to considerable fluctuations in temperature.

In accordance with an exemplary embodiment, the connecting material contains at least one of the following materials: epoxy resin, cyanoacrylate, acrylate monomers, MS polymers, polyurethane, thermoplastics and silicone. With such a connecting material, sufficient adhesion can be effected even in the case of changing temperatures and/or humidities. The connecting material can further be adapted to the joining partners, that is to say to the material of the reinforcing plate and/or of the outer structure.

In accordance with an exemplary embodiment, removing the section comprises milling the outer structure. It is thus possible, for example, for the outer structure to be milled from the outside in a predefined depth. Damage to other components or pieces of equipment inside the outer structure that are positioned close to the outer structure can thus be avoided. The edges on the outer structure can remain untreated because they are protected at least on one side by the reinforcing plate.

In accordance with an exemplary embodiment, removing can first comprise milling a hole through the edge region of the removable section and at least partly into the reinforcing plate before the removable section is separated from the outer structure. A problem with fitting can be reduced in this way.

In accordance with an exemplary embodiment, the step of removing the section can comprise using a laser or a comparable cutter.

In accordance with an exemplary embodiment, the section can be removed by an automated procedure, for example, by an industrial robot.

In accordance with an exemplary embodiment, the method further comprises performing maintenance and repair work on an item of equipment of the aircraft by means of the service access. The item of equipment can be, for example, a piece of equipment, a component or a comparable structural part which is installed or mounted in the aircraft. The service access can simplify access to the item of equipment. Depending on the size of the through-opening or service access, a technician can reach into the aircraft or stretch/climb at least partly into the aircraft.

In accordance with an exemplary embodiment, the method further comprises closing the service access by means of the removed section of the outer structure. The service access can thus be closed with an accurate fit. Any manufacturing tolerances or other inaccuracies during the production of alternative closure elements can thus be avoided.

In accordance with an exemplary embodiment, the method further comprises fastening the removed section of the outer structure to the reinforcing plate. The removed section can thus be created for one-time access in the case of a non-releasable fastening or for regular access if new information is available which indicates that regular access to this region is necessary. In the second case, the removed section is releasably fastened to the reinforcing plate. For releasable fastening there can optionally be used a hole which has been pre-drilled through the edge region of the removable section and at least partly into the reinforcing plate during the removing.

In accordance with an exemplary embodiment, the method further comprises sealing the outer structure by means of a sealing material which is introduced into a gap formed during the removing. In this way, the tightness of the outer structure, in particular tightness with respect to dirt and/or fluid ingress, can be increased.

Where expedient, the above embodiments and developments can be combined with one another as desired. Further possible embodiments, developments and implementations of the invention also include combinations not explicitly mentioned of features of the invention described hereinbefore or in the following in respect of the exemplary embodiments. In particular, a person skilled in the art will also add individual aspects as improvements or additions to the respective basic form of the present invention.

BRIEF DESCRIPTION OF THE DRAWINGS

The invention will be explained in greater detail with reference to exemplary embodiments depicted in the drawings as appended.

Figure 1:
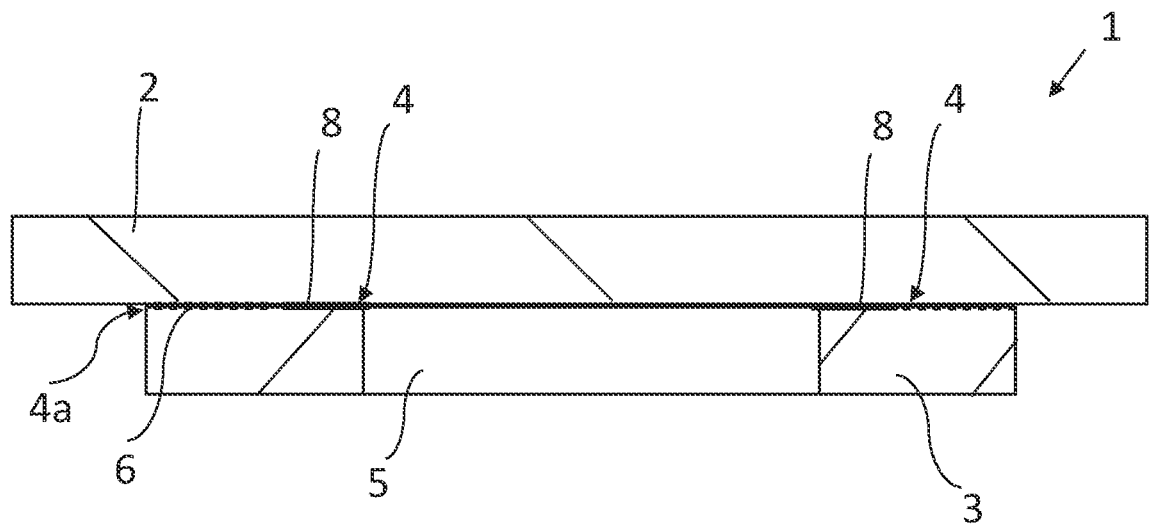
FIG. 1 shows a schematic sectional view of a device for creating a stiffened region on an outer structure of an aircraft for subsequently providing a service access if required, according to an exemplary embodiment of the invention.

In the Figures of the drawing, elements, features and components which are identical, functionally identical and have the same effect are in each case provided with the same reference signs—unless stated otherwise.

DETAILED DESCRIPTION

Although specific embodiments and developments are shown and described here, a person skilled in the art will prefer that a large number of alternative and/or equivalent embodiments can replace the specific exemplary embodiments which are shown and described, without departing from the scope of the present invention. This application is generally to cover all modifications of or changes to the specific exemplary embodiments described herein.

The accompanying figures are intended to impart a further understanding of embodiments of the invention and, in association with the description, serve to explain principles and concepts of the invention. Other exemplary embodiments and many of the mentioned advantages will become apparent with reference to the drawings. The drawings are to be understood only as being schematic drawings, and the elements of the drawings are not necessarily shown true to scale relative to one another. Directional terminology such as, for example, "top", "bottom", "left", "right", "over", "under", "horizontal", "vertical", "front", "back" and similar terms are used merely for the purposes of explanation and do not serve to limit the generality to specific forms as shown in the figures.

A connecting material within the meaning of the present invention includes both a connecting material which is additionally to be introduced and which fastens the outer structure and the reinforcing plate together, in particular an adhesive, and a connecting material which is contained in the outer structure and/or in the reinforcing plate and which, on joining, bonds materially with the material of the respective other component, that is to say of the reinforcing plate or of the outer structure. In particular, the connecting material according to the invention includes the component of the matrix material of a fibre composite material which cures in a so-called co-curing process for substance-to-substance bonding with a joining partner.

FIG. 1 shows a schematic sectional view of a device 1 for creating a stiffened region on an outer structure 2 of an aircraft for subsequently providing a service access if required.

The device 1 comprises an outer structure 2, a reinforcing plate 3, a contact surface 4 between the outer structure 2 and the reinforcing plate 3, a through-opening 5, a connecting material 6 and an optional separating means 8.

The outer structure 2 is represented by a cut-out portion and can also extend beyond the cut-out portion shown. The outer structure 2 can be planar or curved at least in some portions. Furthermore, the outer structure 2 can contain aluminium and/or a fibre composite. Optionally, the outer structure 2 can have a coating at least in some portions on its inner side, its outer side or on its inner and outer side. In addition, the outer structure 2 has a predetermined installation region, which is defined on construction. The outer structure 2 may be in the form of an aerodynamic outer structure.

The reinforcing plate 3 is mounted mechanically on the inner side of the outer structure 2 in the predetermined installation region. In particular, the reinforcing plate 3 is connected to the outer structure 2 by substance-to-substance bonding. Alternatively or in addition, the reinforcing plate 3 can be mounted on the outer structure 2 by means of a rivet connection, a screw connection or the like. The reinforcing plate 3 and the outer structure 2 form the common contact surface 4. The geometry of the reinforcing plate 3 at the contact surface 4 may correspond substantially to the geometry of the inner side of the outer structure 2 at the contact surface 4.

The reinforcing plate 3 further has the through-opening 5, which extends along the surface normal of the contact surface 4. The through-opening 5 is, for example, round, polygonal or a combination thereof. The through-opening 5 is further dimensioned such that a maintenance technician has sufficient space to take hold of items of equipment positioned behind the outer structure 2 or to pass tools through. Alternatively or in addition, the through-opening can be dimensioned such that the maintenance technician is able to extend parts of his body through the through-opening 5 and/or is able to remove at least a region/a component of the items of equipment through the through-opening 5.

The connecting material 6 is provided in an edge region 4a of the contact surface 4. The connecting material 6 is provided either in the entirety of the peripheral edge region 4a of the contact surface 4 or in some portions of the peripheral edge region 4a. The connecting material 6 contains in particular cyanoacrylate, epoxy resin, polyester, thermoplastics and/or acrylate monomers.

Optionally, the device 1 has the separating means 8, which here is in the form of a separating film. By way of example, the separating film 8 is provided at least in some portions in a second contact region 4c between the edge region 4a of the contact surface 4, in which the connecting material 6 is contained at least in some portions, and the through-opening 5. In other words, the separating film 8 is provided at least in some portions in the second contact region 4c of the contact surface 4. By way of example, the separating film 8 is so depicted in FIG. 1 that it adjoins both the connecting material 6 and the through-opening 5. That is to say, the separating film 8 is located where no connecting material 6 is arranged on the contact surface 4. The separating film 8 can adhere to the reinforcing plate 3 and/or to the outer structure 2. Alternatively, the separating film 8 can be held in position by the contact pressure between the reinforcing plate 3 and the outer structure 2.

Alternatively, the connecting material 6 can overlap the separating means 8 at least in some portions. That is to say, the connecting material 6 can extend, for example, over the entire contact surface 4, wherein the separating means 8 is provided in the first contact region 4b and adhesion of the connecting material 6 to at least one of the two joining partners, that is to say to the removable section 7 and/or to the reinforcing plate 3, is prevented.

The separating means 8 can further be arranged relative to the connecting material 6 in the edge region 4a of the contact surface 4 such that a section 7 of the outer structure 2 within the contact surface 4, that is to say along the contact surface 4, is removable, wherein the section 7 has a smaller areal extent than the reinforcing plate 3.

Figure 2:
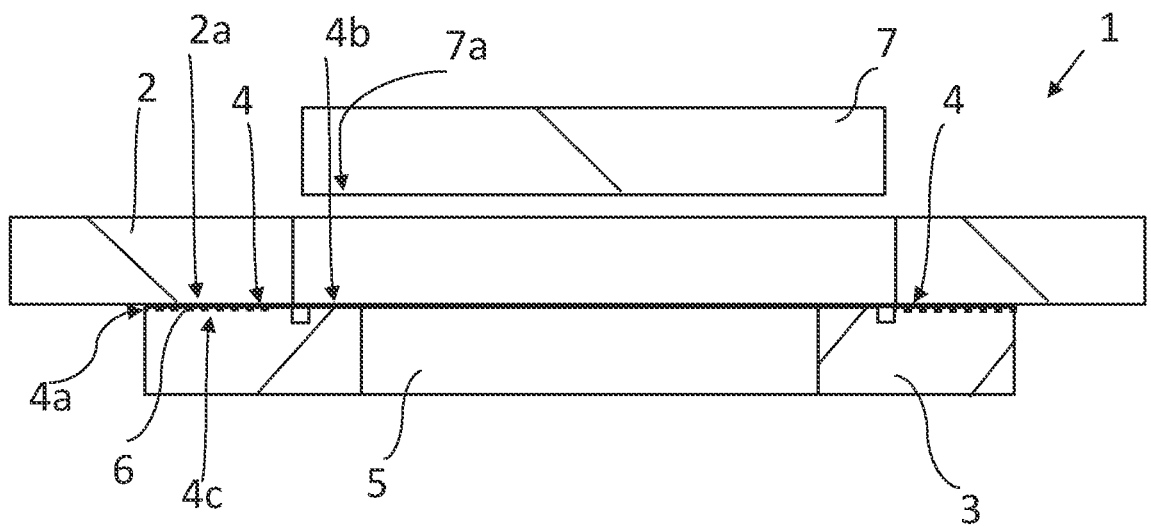
FIG. 2 shows a schematic sectional view of a device for creating a stiffened region on an outer structure of an aircraft for subsequently providing a service access if required, having a removed section of the outer structure, according to a further exemplary embodiment of the invention.

FIG. 2 shows a schematic sectional view of a device 1 for creating a stiffened region on an outer structure 2 of an aircraft for subsequently providing a service access if required, having a removed section 7 of the outer structure 2.

The device 1 according to FIG. 2 has substantially the same features as the device according to FIG. 1, wherein FIG. 2 shows a state of the device 1 in which the removable section 7 of the outer structure 2 has been removed in order to provide a service access.

The removable section 7 has a smaller areal extent than the reinforcing plate 3, wherein the through-opening 5 has a smaller areal extent than the removable section 7, so that a first contact region 4b of the contact surface 4 between the reinforcing plate 3 and an edge region 7a of the removable section 7 and a second contact region 4c of the contact surface 4 between the reinforcing plate 3 and a region 2a of the structure 2 that is adjacent to the edge region 7a of the removable section 7 is formed.

By way of example, the removable section 7 has been removed from the outer structure 2 by milling by means of a milling cutter. After the milling operation, the reinforcing plate 3 can have along the milling head path a depression produced by the milling head.

The removed section 7 may be in the form of an access cover.

The second contact region 4b of the contact surface 4 serves, for example, as a shoulder for the removed section 7, in order to support the section 7.

Figure 3:
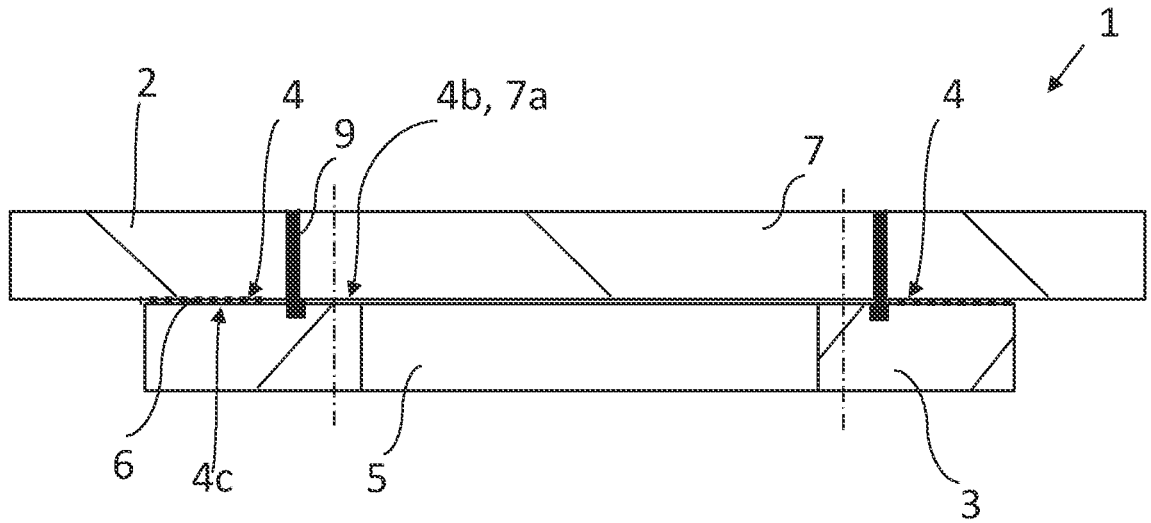
FIG. 3 shows a schematic sectional view of a device for creating a stiffened region on an outer structure of an aircraft for subsequently providing a service access if required, having a section of the outer structure fastened to the reinforcing plate, according to a further exemplary embodiment of the invention.

FIG. 3 shows a schematic sectional view of a device 1 for creating a stiffened region on an outer structure 2 of an aircraft for subsequently providing a service access if required, having a section 7 of the outer structure 2 fastened to the reinforcing plate 3.

FIG. 3 shows a state of the device 1 in which the removed section 7 of the outer structure 2 has been fastened to the reinforcing plate 3 after maintenance work has been completed by a maintenance technician with the aid of the service access which has been created.

The section 7 is fastened to the reinforcing plate 3 by means of a screw connection, for example, in particular when a releasable fastening is provided. For a non-releasable fastening, the section 7 can be adhesively bonded to the reinforcing plate 3 by means of a connecting material, for example, by means of the connecting material 6. The section 7 is further fastened to the reinforcing plate 3 in such a manner that the outer side of the section 7 is planar with the outer side of the outer structure 2. In this way, adverse effects, for example on the aerodynamics, are reduced.

There can optionally be provided a sealing material 9 which seals the outer structure 2. The sealing material 9 may be introduced into a gap between the outer structure 2 and the section 7 which has been caused by the milling operation. The sealing material 9 can also be provided in the depression which has been formed in the reinforcing plate 3 by the milling head.

Figures 4, 5:
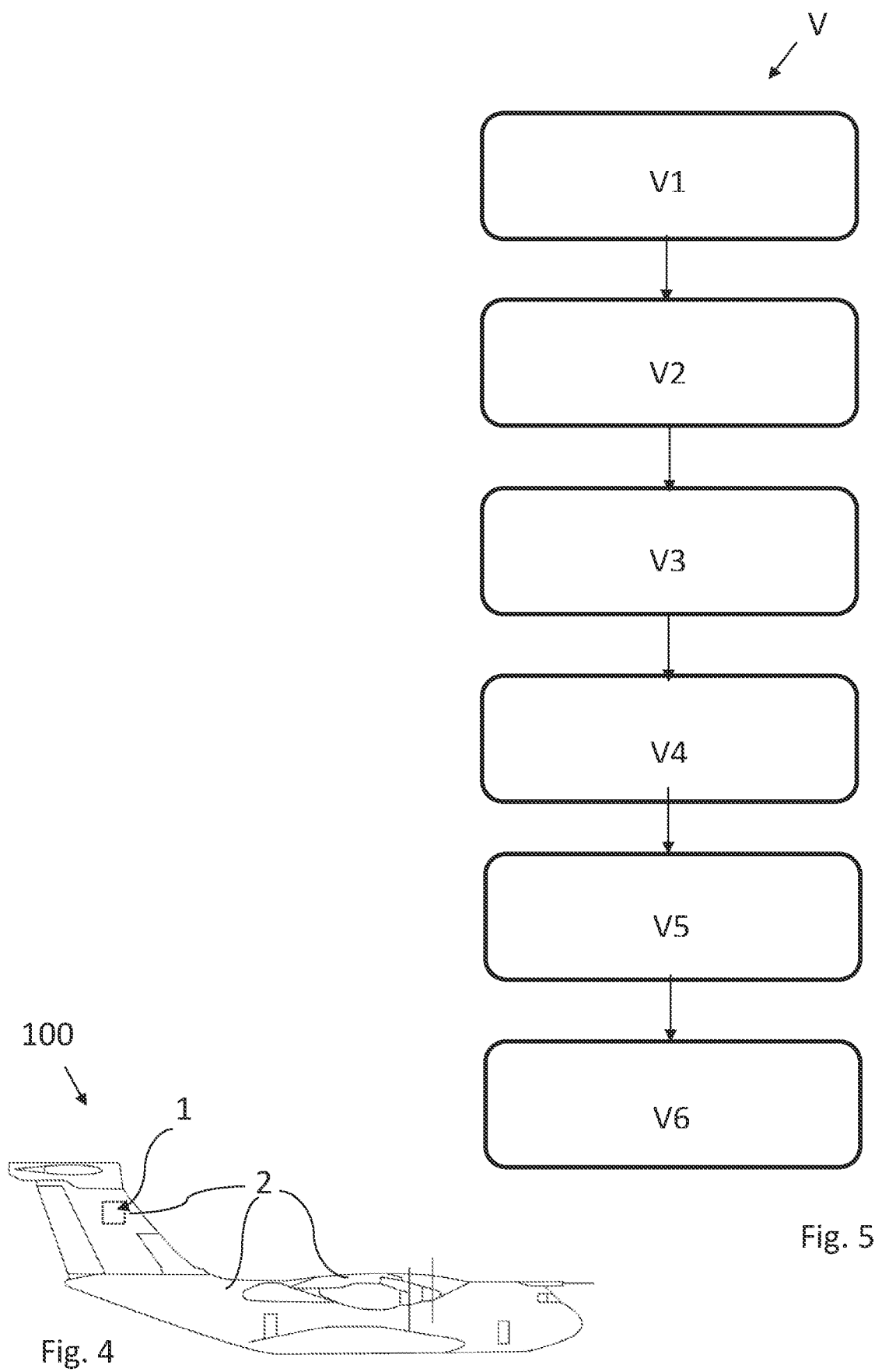
FIG. 4 shows a schematic side view of an aircraft having a device according to an exemplary embodiment of the invention.
FIG. 5 shows a flow diagram of a method for producing and using a service access for an outer structure of an aircraft according to an exemplary embodiment of the invention.

FIG. 4 shows a schematic side view of an aircraft 100 having a device 1. The device 1 has substantially the same features as the device according to FIG. 1.

By way of example, the outer structure 2 is in the form of an aerofoil, fuselage, nacelle, rudder unit or the like.

FIG. 5 shows a flow diagram of a method V for producing and using a service access for an outer structure 2 of an aircraft. The method V comprises, for example, a step of providing V1, a step of removing V2, a step of performing V3, a step of closing V4, a step of fastening V5 and a step of sealing V6.

In the case of providing V1, a device 1 having the features of the device 1 according to FIG. 1 is provided, for example. The device 1 may be integrated during the production stage of the aircraft.

The method V additionally comprises removing V2 a section 7 of the outer structure 2 within the contact surface 4 in order to provide the service access, wherein the section 7 has a smaller areal extent than the reinforcing plate 3. In particular, only the section 7 of the outer structure 2 is removed. The service access may be in closable form.

In the exemplary method V, the section 7 is removed by milling of the outer structure 2. However, it is not limited to milling but can optionally be removed by means of a saw, a laser cutter or other tools. After the removing V2, the device 1 is, for example, in the form shown and described in FIG. 2.

In addition, the method V can further comprise the step of performing V3 maintenance work on an item of equipment of the aircraft by means of the service access. For example, damaged hydraulic devices can thus be repaired. In particular, the maintenance work is unplanned maintenance work on components which were originally developed and implemented to be maintenance-free but then unexpectedly exhibit a fault.

The method V can further comprise the step of closing V4 the service access by means of the removed section 7 of the outer structure 2.

Furthermore, the removed section 7 of the outer structure 2 can be non-releasably or releasably fastened V5 to the reinforcing plate 3. If it is to be assumed that a fault will again occur, the section 7 can be releasably mounted on the reinforcing plate 3, so that the section 7 does not have to be removed again if a fault occurs again but is opened by way of the releasable fastening. In the case of releasable fastening V5, the removed section 7 acts like an access panel which can repeatedly be opened and closed.

In addition, the method V can further comprise the step of sealing V6 the outer structure 2 by means of a sealing material 9 which is introduced into the gap that has formed during the removing V2. The sealing material 9 can be injected into the gap by means of an adhesive gun, for example. After the sealing material 9 has been applied, it can be exposed to heat, moisture and/or UV radiation in order to improve and/or accelerate curing of the sealing material 9.

After the steps of fastening V5 and sealing V6 have been applied, the device 1 is, for example, in the form shown and described in FIG. 3.

In the preceding detailed description, various features have been combined in one or more examples in order to improve the stringency of the description. However, it should be clear that the above description is merely illustrative, but in no way limiting in nature. It serves to cover all alternatives, modifications and equivalents of the various features and exemplary embodiments. Many other examples will immediately become clear to a person skilled in the art in light of the above description owing to his expert knowledge.

The exemplary embodiments have been chosen and described in order to allow the principles underlying the invention and their possible applications in practice to be illustrated in the best possible way. As a result, experts are able to optimally modify and use the invention and its various exemplary embodiments in relation to the intended purpose. In the claims and the description, the terms "containing" and "having" are used as linguistically neutral expressions for the corresponding term "comprising". Furthermore, any use of the terms "one" and "a" is in principle not to exclude a plurality of features and components so described.

For example, the present invention is not limited to the application to aerodynamic outer structures but can likewise be applied to conventional outer structures and access panels provided therein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for creating a stiffened region on an outer structure of an aircraft for subsequently providing a service access if required, the device comprising:
    an outer structure;
    a reinforcing plate mounted in a predetermined installation region on an inner side of the outer structure and forms a contact surface between the reinforcing plate and the outer structure, wherein the reinforcing plate has a through-opening along the surface normal of the contact surface;
    a connecting material which connects the reinforcing plate to the outer structure in an edge region of the contact surface by substance-to-substance bonding and/or by interlocking engagement;
    wherein the outer structure has a removable section which has a smaller areal extent than the reinforcing plate; and,
    wherein the through-opening has a smaller areal extent than the removable section, so that a first contact region of the contact surface between the reinforcing plate and an edge region of the removable section and a second contact region of the contact surface between the reinforcing plate and a section of the structure that is adjacent to the edge region of the removable section is formed.

2. The device according to claim 1, further having a separating means for detaching the removable section of the outer structure from the reinforcing plate without leaving any residue, which separating means is provided at least in some portions in the first contact region of the contact surface.

3. The device according to claim 2, wherein the separating means is in the form of a separating film, a peel ply or a separating agent.

4. The device according to claim 2, wherein the separating means is formed along the entire edge region of the removable section.

5. The device according to claim 1, wherein the first contact region is in the form of a support frame for supporting the edge region of the removable section.

6. The device according to claim 1, wherein the reinforcing plate has at least one of the following materials: a metallic material, in particular aluminium, a ceramics material, a polymer material and a fibre-reinforced composite material, in particular a carbon fibre composite material or a glass fibre composite material.

7. The device according to claim 1, wherein the reinforcing plate is produced from the same material as the outer structure.

8. The device according to claim 1, wherein the connecting material contains at least one of the following materials: epoxy resin, cyanoacrylate, acrylate monomers, MS polymers, polyurethane, thermoplastics and silicone.

9. An aircraft having the device according to claim 1.

10. A method for producing and using a service access for an outer structure of an aircraft, the method (V) comprising:
    providing (V1) a device according to claim 1; and,
    removing (V2) a section of the outer structure along at least part of the contact surface in order to provide the service access, wherein the section has a smaller areal extent than the reinforcing plate.

11. The method according to claim 10, wherein removing (V2) the section comprises milling the outer structure.

12. The method according to claim 10, further comprising performing (V3) maintenance and repair work on an item of equipment of the aircraft by means of the service access.

13. The method according to claim 10, further comprising closing (V4) the service access by means of the removed section of the outer structure; and
    fastening (V5) the removed section of the outer structure to the reinforcing plate.

14. The method according to claim 10, further comprising sealing (V6) the outer structure by means of a sealing material which is introduced into a gap formed during the removing (V2).

* * * * *